(12) United States Patent
Perälä et al.

(10) Patent No.: US 8,892,392 B2
(45) Date of Patent: Nov. 18, 2014

(54) STATE VECTOR ESTIMATION USING A CONSTRAINT DERIVED FROM A MAP

(75) Inventors: Tommi Perälä, Tampere (FI); Simo Ali-Löytty, Tampere (FI)

(73) Assignee: Nokia Corporation, Espoo (FI)

(*) Notice: Subject to any disclaimer, the term of this patent is extended or adjusted under 35 U.S.C. 154(b) by 956 days.

(21) Appl. No.: 13/056,356

(22) PCT Filed: Jul. 30, 2008

(86) PCT No.: PCT/EP2008/060019
§ 371 (c)(1),
(2), (4) Date: Apr. 15, 2011

(87) PCT Pub. No.: WO2010/012303
PCT Pub. Date: Feb. 4, 2010

(65) Prior Publication Data
US 2011/0196647 A1    Aug. 11, 2011

(51) Int. Cl.
| | |
|---|---|
| *G01S 19/42* | (2010.01) |
| *G01S 19/50* | (2010.01) |
| *G01C 21/20* | (2006.01) |
| *G01S 19/07* | (2010.01) |
| *G06F 19/00* | (2011.01) |
| *G01C 21/30* | (2006.01) |

(52) U.S. Cl.
CPC .............. *G01C 21/206* (2013.01); *G06F 19/00* (2013.01); *G01C 21/20* (2013.01); *G01S 19/07* (2013.01); *G01S 19/42* (2013.01); *G01C 21/30* (2013.01); *G01S 19/50* (2013.01)
USPC ........... 702/150; 701/409; 701/431; 701/445; 701/469; 702/1; 702/127; 702/187; 702/189; 708/200

(58) Field of Classification Search
CPC ...... G01C 21/00; G01C 21/20; G01C 21/206; G01C 21/26; G01C 21/28; G01C 21/30; G01D 7/00; G01D 9/00; G01D 21/00; G01S 5/00; G01S 5/02; G01S 5/14; G01S 19/00; G01S 19/01; G01S 19/05; G01S 19/06; G01S 19/07; G01S 19/38; G01S 19/39; G01S 19/40; G01S 19/42; G01S 19/50; G06F 11/00; G06F 11/30; G06F 11/32; G06F 11/34; G06F 17/00; G06F 17/18; G06F 17/40; G06F 19/00
USPC ........ 340/944, 988, 989, 990, 995.1, 995.25, 340/995.28; 701/1, 3, 19, 21, 22, 23, 400, 701/408, 409, 431, 433, 434, 445, 468, 701/469; 702/1, 85, 94, 95, 127, 150, 152, 702/153, 187, 189; 708/100, 105, 200
See application file for complete search history.

(56) References Cited

U.S. PATENT DOCUMENTS 5,311,173 A    5/1994   Komura et al.

FOREIGN PATENT DOCUMENTS

| | | |
|---|---|---|
| SE | 0004096-4 | 11/2000 |
| WO | 0239063 | 5/2002 |

OTHER PUBLICATIONS

International Search Report (PCT/ISA/210) and Written Opinion of the ISA (PCT/ISA/237), International Application No. PCT/EP2008/060019, dated Apr. 9, 2010 (21 pages total) citing US 5,311,173 (D1), Cerenka et al (D2), Maan et al (D3), and Ali-Loytty et al (D4).

(Continued)

*Primary Examiner* — Edward Cosimano
(74) *Attorney, Agent, or Firm* — Locke Lord LLP

(57) ABSTRACT

It is disclosed to estimate a state vector of an object, wherein the state vector comprises a state variable related to a position or an orientation of the object, based on at least one of a probability density function of the state vector truncated under consideration of a constraint for the state variable, wherein the constraint is derived from a map, and properties of the truncated probability density function.

20 Claims, 6 Drawing Sheets

(56) References Cited

OTHER PUBLICATIONS

International Preliminary Report on Patentability (PCT/IPEA/409), International Application No. PCT/EP2008/060019, dated Sep. 14, 2010 (15 pages total).
Simo Ali-Loytty et al., "A Modified Kalman Filter for Hybrid Positioning", Proceedings of ION GNSS 19th International Technical Meeting of the Satellite Division, Sep. 26-29, 2006, Fort Worth, TX, pp. 1679-1686 (8 pages total).
Szymon Ceranka et al., "Application of Particle Filtering in Navigation System for Blind", Signal Processing and Its Applications, Seventh International Symposium, Jul. 1-4, 2003, Piscataway, NJ, IEEE, pp. 495-488 (4 pages total) vol. 2, Jul. 1, 2003.
Maan E. El Najjar et al., "A Road-Matching Method for Precise Vehicle Localization Using Belief Theory and Kalman Filtering", Autonomous Robots, Kluwer Academic Publishers, BO, vol. 19, No. 2, Sep. 1, 2005, pp. 173-191 (20 pages total).
Frederic Evennou et al, "Map-aided Indoor Mobile Positioning System using Particle Filter", Wireless Communications and Networking Conference, 2005 IEEE New Orleans, LA, Mar. 13-17, 2005, Piscataway NJ, IEEE, pp. 2490-2494 (5 pages total).
Frederic Bourgault et al., "Process Model, Constraints, and the Coordinated Search Strategy", Proceedings of the 2004 IEEE, International Conference on Robotics & Automation, New Orleans, LA, Apr. 26-May 1, 2004, pp. 5256-5261 (6 pages total).
K. Gilholm et al., "Spatial distribution model for tracking extended objects, Target tracking: algorighms and applications", IEEE Proceedings: Radar, Sonar & Navigation, Institution of Electrical Engineers, Oct. 7, 2005, pp. 364-371 (8 pages total).
Urban Forssell et al., "Map-Aided Positioning System", Proceedings of the FISITA 2002 World Automative Congress (11 pages total).
Martin Klepal Widyawan, "A Backtracking Particle Filter for Fusing Building Plans with PDR Displacement Estimates," Proceedings of the 5th Workshop on Positioning, Navigation and Communication, IEEE, Hanover, Germany, Mar. 27, 2008, pp. 207-212 (6 pages total).
U. Schneider et al., "Introducing digital map information into train positioning systems: chances and risks", International Conference on Computers in Railways No. 7, Bologne, Italy, (10 pages total), 2000.
Dan Simon et al., "Kalman Filtering with State Equality Constraints" (32 pages total).
Peter Hall, "A Bayesian Approach to Map-Aided Vehicle Positioning", Master Thesis LiTH-ISY-EX-3104, Department of Electrical Engineering, Linkoping Univeristy, Sweden, 2001 (66 pages total, in Swedish).
Dan Simon et al., Constrained Kalman Filtering Via Density Function Truncation for Turbofan Engine Health Estimation, Apr. 2006 (27 pages total).

STATE VECTOR ESTIMATION USING A CONSTRAINT DERIVED FROM A MAP

FIELD

This invention relates to the estimation of a state vector of an object under consideration of a constraint derived from a map.

BACKGROUND

Determining the state of an object is an important task. In many applications, a state vector that comprises a state variable related to a position or an orientation of the object is used to describe the state of the object.

The state vector at a specific point in time is often not known. Thus, it has to be estimated. For this purpose, measurements related to a state variable that forms part of the state vector can be taken into account. Due to measurement and modeling errors, state vector estimation does generally not yield accurate results. The state vector estimate is therefore often expressed in terms of statistical information.

However, in many applications certain values of a state variable or a state vector can be excluded because they are improbable.

SUMMARY OF SOME EXEMPLARY EMBODIMENTS OF THE INVENTION

An estimate may not represent a likely state of an object if constraints for state variable are not accounted for.

According to a first aspect of the present invention, a first apparatus is disclosed, comprising means for estimating a state vector of an object, wherein the state vector comprises a state variable related to a position or an orientation of the object. The estimation is based on at least one of a probability density function of the state vector truncated under consideration of a constraint for the state variable derived from a map, and properties of the truncated probability density function.

The means for estimating the state vector based on at least one of a probability density function of the state vector truncated under consideration of a constraint for the state variable derived from a map, and properties of the truncated probability density function, may for instance comprise a processor that is configured to estimate the state vector based on at least one of a probability density function of the state vector truncated under consideration of a constraint for the state variable derived from a map, and properties of the truncated probability density function. According to the first aspect of the present invention, further a second apparatus is disclosed, comprising a processor configured to estimate a state vector of an object, wherein the state vector comprises a state variable related to a position or an orientation of the object, based on at least one of a probability density function of the state vector truncated under consideration of a constraint for the state variable derived from a map, and properties of the truncated probability density function.

The first apparatus as well as the second apparatus according to the present invention can be a module that forms part of or is to form part of another apparatus, for instance a processor, or it can be a separate apparatus.

According to a second aspect of the present invention, further a method is disclosed, comprising estimation of a state vector of an object, wherein the state vector comprises a state variable related to a position or an orientation of the object. The estimation of the state vector is based on at least one of a probability density function of the state vector truncated under consideration of a constraint for the state variable, wherein the constraint is derived from a map, and properties of the truncated probability density function.

According to a third aspect of the present invention, further a program is disclosed, comprising program code for performing the method according to the second aspect of the present invention, when the program is executed on a processor. The program may for instance be a computer program that is readable by a computer or processor. The program code may then for instance be computer program code. The program may for instance be distributed via a network, such as for instance the Internet. The program may for instance be stored on a tangible readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to a fourth aspect of the present invention, further a readable storage medium encoded with instructions that, when executed by a processor, perform the method according to the second aspect of the present invention is disclosed.

The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

According to a fifth aspect of the present invention, further a program is disclosed which causes a processor to estimate a state vector of an object, wherein the state vector comprises a state variable related to a position or an orientation of the object, based on at least one of a probability density function of the state vector truncated under consideration of a constraint for the state variable, wherein the constraint is derived from a map, and properties of the truncated probability density function.

The program may for instance be a computer program that is readable and/or executable by a computer or processor. The program may for instance be a computer program with computer program code. The program may be stored on a tangible readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

The term object encompasses every kind of entity. Thus, the object may be a human being or an animal as well as vehicle or a device such as a transceiver. It is not necessary that the object is a tangible object. A virtual object, for instance an object instantiated within a computer simulation of a technical process, e.g. a robotic arm in a simulation of a manufacturing process, is also an object in the sense of the present invention. Of course, these are only some examples and the term object covers every other object, too.

A state variable can be assigned to an object. Such a state variable can contain information on various aspects related to the object. For example, a state variable can contain the position of the object along an axis of any given coordinate system. Of course, a set of state variables can comprise the position of the object along more than one axis. Another exemplary state variable contains information on a velocity or an acceleration of the object. Any other property of the object can be described by means of a state variable. Among others, the weight of the object may be stored in a state variable.

Furthermore, it is possible to use a state variable to characterize the object itself. For example, a classification of the object as a human being, an animal or a vehicle can be expressed by means of a state variable. It is possible, but not a precondition, for a state variable that it evolves over time.

A variety of state variables exists that are related to the position or the orientation of an object. A velocity component along an axis of a given coordinate system comprises directional information and is thus related to an orientation. The same holds for state variables that are associated with acceleration data of the object. If, for instance, the object is a vehicle, the steering wheel angle is also related to the orientation of the object because, when driving, the vehicle will move in the direction indicated by the steering wheel angle. Another exemplary state variable reflects if the left blinker of a vehicle or the right blinker of the vehicle is turned on. As turning on a blinker serves for indicating a direction the vehicle will soon adopt, such a state variable is related to the orientation of the vehicle, i.e. the object.

The set of all state variables of an object that are considered for a specific application form a state vector. It is to be understood that a state vector may also consist of a single state variable only.

A constraint is a condition that a state variable related to a position or an orientation of an object has to satisfy. By incorporating a constraint into state vector estimation, restrictive information can be exploited. An exemplary constraint comprises that the value of the state variable has to satisfy the condition of being greater than or equal to a first fixed value. Another constraint comprises that the value of the state variable has to satisfy the condition of being less than or equal to a second fixed value. Of course, these conditions can be combined and thus establish a single constraint that demands that the value of the state variable falls in the interval limited by the two conditions. Among various other possible constraints, it can of course be also demanded that the value of the state variable related to a position or an orientation of an object is unequal to a fixed value.

A constraint for a state variable related to a position or an orientation of an object is derived from a map. The term map is to encompass every kind of information source comprising position based information. Thus, a map in the sense of the present invention provides data associated with a position. For example, a map can be a geographic map such as a road map. In this specific case, the data associated with a position comprise the information whether the course of a road covers the position and possibly some kind of label of the road such as a number or a name that is assigned to it.

Another type of geographic map comprises information on the elevation with respect to the sea level or any other reference level of a certain geographic position. A map may also provide information on whether an obstacle such as a wall of a building, a watercourse or a cliff is located at a certain position. Aerial photographs may serve for the same purpose. A floor plan of a building is also a map in the sense of the present invention. It offers a wide range of position based information. For example, it can be inferred from a floor plan whether a position is located in a certain room or in a corridor. Moreover, and among others, the location of doors, stairs, elevators and indoor and outdoor walls can be extracted from a floor plan.

The term map shall not be understood as implying that a map has to be a static source of position based information, although this is possible. A map may also be dynamically generated, for instance by means of a sensor. Laser range scanners or ultra sonic sensor technology may acquire position based information and thus serve as sources for this kind of information. In an exemplary scenario, a laser scanner can be used to detect walls, pieces of furniture or people standing in a room. As these entities occupy space on the floor of the room or a volume within the room, these areas and volumes can be discriminated from areas and volumes that are vacant. Thus, the data acquired by the laser range scanner constitute a map that allows for distinguishing vacant floor positions or room volumes from those that are occupied.

A dynamic map can offer valuable information, for instance it can indicate whether, at a certain point in time, an automatic door is open or closed.

A variety of possibilities for deriving a constraint for a state variable of an object related to a position or an orientation of the object from a map exist. If, for example, the object is a person that is known to be located in a building and the map is a floor plan, a reasonable constraint for a state variable containing information on the position of the person would be to establish that the position of the person cannot be identical to the position of a wall that delimits the room. Apart from constraints that serve for excluding impossible state variable values, constraints can also be taken into account to rule out state variable values that are unlikely or are not desired due to other reasons.

In another exemplary scenario, the object can be a mobile robot that is equipped with a radar device that enables it to detect obstacles. Due to this ability the mobile robot can be programmed to not go below a minimum distance to any obstacle in its vicinity. It may then be unlikely that the distance of the mobile robot to an obstacle does go below the minimum distance in spite of its programming. The distance of the mobile robot to, for instance, the closest obstacle can be stored in a state variable of the mobile robot. It is related to the position of the robot because the distance can be calculated from the position of the obstacle and the position of the mobile robot. Making the above assumption, a constraint imposed on the value of the state variable in which the distance of the mobile robot to the closest obstacle is stored in can be that it has to be greater than or equal to the minimum distance.

To give another example, the object can be a vehicle and the map can be a road map stored in a Global Positioning System (GPS) device. Although this may not be valid for an off-road vehicle, other vehicles are likely to drive on a road. Thus, a constraint can be imposed on the value of a state variable that comprises information on the vehicle position. The constraint can limit the position of the vehicle to on-road locations. In a similar scenario, the value of a state variable comprising information on the position of a train can be limited to locations on a track based on a railroad map.

In a further exemplary scenario, a constraint is imposed on the value of a state variable related to an orientation of an object. The state vector comprises a state variable related to a position of the object and a state variable related to an orientation of the object. If the object is known to be positioned on a surface having an inclination and provided that a map giving information on the surface inclination for the position of the object and other positions with a certain precision, a constraint for the value of the state variable that comprises information related to an orientation, i.e. inclination in this case, can be established. For example, the value of the state variable related to an inclination of the object can be limited to a range falling within an interval of a certain width centered at the inclination value extracted from the map for the position. Of course, it is also possible to impose a constraint on the state variable related to a position of the object by taking into account its inclination and information extracted from the map described above.

It is to be understood that not only state variables that form part of the state vector that is to be estimated can be used as a basis for deriving the constraint from the map. With reference to the above example, it is of course also possible to estimate the inclination of the object although no variable relating to the positions forms part of the state vector. For example, a fixed and known position of the object does not need to be estimated and does therefore not need to be contained in the state vector.

It is noted that consideration of a constraint for a state variable means that at least one constraint is considered. Thus, consideration of more than one constraint for more than one state variable is also encompassed by the present invention. Two constraints for two state variables related to a position of an object, for instance, can be considered. For example, the position of the object can than be limited in two directions orthogonal to one another.

In many cases, the state vector of an object at a given point in time is not known exactly. Hence, it has to be estimated in order to obtain the desired state variable values. In the scope of the present invention, state vector estimation can either be performed time discretely or continuously. Moreover, it is also noted that in state vector estimation more than one state vector estimate may be estimated.

For example, a Global Navigation Satellite System (GNSS) such as GPS can be used to locate a vehicle. However, scenarios exist in which position detection using GPS does not yield satisfying results.

Walls of high buildings may cause weak GPS signals at the position of a vehicle located on a road running between these buildings. Exact position determination may then not be possible. In another exemplary scenario, reaching the goal of detecting the position of a user moving within a building may be hindered by adverse radio signal propagation conditions.

Estimation of a state variable value is usually subject to errors. The measurements state vector estimation is often based on can be inaccurate. Consequently, the state vector estimate is affected by the measurement error and is likely to be inaccurate, too. Moreover, a model assumed to represent the relation between measurement values and the value of a state variable does generally not reflect every aspect of the real relation between these values. This may lead to further difficulties in estimating a state variable value correctly. As a result, the estimate is afflicted with uncertainty. This uncertainty can be expressed in terms of statistical values. Uncertainty can thus be quantified.

A probability density function (pdf) describes a probability distribution. Some exemplary classes of probability distributions comprise the normal distribution, also called the Gaussian distribution, the Laplace distribution, the exponential distribution and the uniform distribution. Values such as the mean and the variance or standard deviation can be derived from a probability density function and are properties thereof. If the probability density function is a multidimensional probability density function, i.e. if it represents the distribution of more than one random variable, a covariance measuring the simultaneous deviations of two of these random variables from their respective means can be computed and used to characterize the multidimensional probability density function and thus the probability distribution. The covariances associated with the random variables of a random variable vector aggregate in a covariance matrix.

A state vector described with reference to a probability density function either estimated or given as an initialization or properties of such a probability density function may serve as a basis for further estimation steps. In consequence, state vector estimation is based on a probability density function of the state vector. If the estimation step is not only based on a probability density function that has been determined before but also a current measurement is taken into account, the resulting probability density function is often referred to as posterior probability density function. State vector estimation is also based on a probability density function of the state vector or properties of a probability density function if a state vector estimate that is obtained in state vector estimation is described with reference to a probability density function or properties of a probability density function.

A probability density function of a random variable has a support range, i.e. a range of values of the random variable for which the probability is greater than zero. Considering for example a Gaussian probability density function, one finds that it has infinite support. The support of a probability density function can be modified by probability density function truncation. Truncation of a probability density function comprises restricting the support of the probability density function. For instance, the support of the truncated probability density function may be limited to a range of values of a random variable above a lower bound and below an upper bound. The probability that the random variable takes a value that exceeds this range is consequently set to zero. Subsequently, the truncated probability density function can be scaled so as to secure that the scaled truncated probability density function integrates to one.

A probability density function can be truncated under consideration of a constraint, i.e. probability density function truncation can be used to incorporate a constraint into state vector estimation. Consider the following example in which a person is likely to be located in a certain room. Using this knowledge, constraints for the position coordinates of the person, e.g. of a state vector comprising an x-coordinate and a y-coordinate as state variables, can be derived from a floor map by assuming that the walls of the room delimit the space the person can move in. The probability density function describing the whereabouts of the person can then be truncated so that the probability that the x-coordinate state variable or the y-coordinate state variable of the person exceeds the room boundaries is set to zero. It is noted that both of the above constraints can be considered simultaneously. Hence, state vector estimation is based on a probability density function truncated under consideration of a constraint for a state variable. Thus, the estimated state variables are limited to a well chosen range. In consequence, the estimates are likely to be more accurate. Another advantage of incorporating constraints into state vector estimation is that even if there is not a constraint provided for every state variable of the state vector, the estimates of the state variables to which no constraint applies are affected by a constraint applying to another state variable if any kind of dependency exists between these state variables. Thus, the accuracy of the state vector estimate may tend to improve not only for the state variable the constraint has been imposed on, but for some other state variables of the state vector as well.

Properties, such a the mean, the variance, a covariance or a covariance matrix of a probability density function truncated under consideration of a constraint can be determined without performing the actual truncation of the probability density function. For instance, a known relation between the property of the truncated probability density function that is to be obtained and the corresponding property or other properties of the untruncated probability density function, wherein the relation is at least partially determined by the constraint, can be exploited for this purpose.

Some estimation methods comprise imposing a constraint on a state variable by first estimating a state vector without considering the constraint. Subsequently, if the value of the state variable the constraint should have been imposed on does not meet the constraint, it is mapped to a state variable value permitted under consideration of the constraint. As a result, the other state variables of the state vector are not affected by the constraint. It can then happen that state variables of the state vector are inconsistent, i.e. the combination of the state variable values does not match the underlying assumptions of the model of the system that is represented by the state vector. Exemplary embodiments of the present invention do not exhibit this drawback.

It is further possible to combine the information contained in more than one state variable in order to derive a constraint from a map. For example, the object can be a vehicle and a first state variable indicates the velocity of the vehicle in a first surface direction, while a second state variable indicates the velocity in a second surface direction orthogonal to the first surface direction. A third and a fourth state variable indicate the surface position of the vehicle. On the one hand, knowing that the vehicle drove at a high speed in a certain direction in a previous estimation step and in conjunction with the traffic rules, estimation of the vehicle position can be limited to positions on the lane dedicated to vehicles driving in the direction. On the other hand, low vehicle speeds and maybe a fifth state variable that indicates that a blinker is set can indicate an intended change of direction. Limitation of vehicle position estimation to a certain lane can then be relinquished.

In an exemplary embodiment of the first apparatus according to the first aspect of the present invention, the first apparatus further comprises means for deriving the constraint or means for receiving the constraint. The means may for instance comprise a processor that is configured to perform the deriving of the constraint. The processor may for instance be the same processor that is configured to estimate the state vector. Alternatively, the means may comprise an interface configured to perform receiving of the constraint, for instance from another apparatus or device.

In an exemplary embodiment of the second apparatus according to the first aspect of the present invention, the processor is further configured to derive the constraint or to receive the constraint, or the second apparatus further comprises a processor configured to derive the constraint or a processor configured to receive the constraint, for instance from another apparatus or device.

In an exemplary embodiment of the second, the third, the fourth and the fifth aspect of the present invention, additional method steps, modified computer program code or additional instructions stored on a readable storage medium can be employed to derive the constraint or to receive the constraint, for instance from another apparatus or device.

In an exemplary embodiment of the first apparatus according to the first aspect of the present invention, the first apparatus further comprises means for truncating a probability density function to obtain the probability density function truncated under consideration of the constraint. The means may for instance comprise a processor that is configured to perform the truncation of the probability density function. The processor may for instance be the same processor that is configured to estimate the state vector and/or the processor that is configured to derive the constraint.

In an exemplary embodiment of the second apparatus according to the first aspect of the present invention, the processor is further configured to truncate a probability density function to obtain the probability density function truncated under consideration of the constraint, or the second apparatus further comprises a processor configured to truncate the probability density function to obtain the probability density function truncated under consideration of the constraint.

In an exemplary embodiment of the second, the third, the fourth and the fifth aspect of the present invention, additional method steps, modified computer program code or additional instructions stored on a readable storage medium can be employed to truncate a probability density function to obtain the probability density function truncated under consideration of the constraint.

In an exemplary embodiment of all aspects of the present invention, the estimation of the state vector is performed recursively, i.e. the estimation of the state vector comprises at least two state vector estimation iterations and the result of a first state vector estimation iteration is accounted for in a consecutive second state vector estimation iteration. Speaking in terms of signal processing, a recursive filter is a filter which re-uses one or more of its outputs as an input. Employing a recursive approach to state vector estimation can be advantageous, for instance for the following reasons:

First, recursive state vector estimation permits step-by-step refinement of the estimates. For example, if there is provided a criterion that measures the error of a first state vector estimate, this first estimate can be re-used for a second state vector estimation iteration that incorporates limiting the outcome of the estimation iteration to estimates that are close to the first estimate if the error of the first state vector estimate has been small. If this second state vector estimation iteration yields a reduced error, a third iteration can be carried out for which it is secured that the result is close to the second estimate and so on. On the other hand, a first estimate with a large error can be used in order to limit state variable value estimation to values deviating significantly from those of the first estimate. Typically, suchlike methods are used in connection with state vector estimation approaches that employ a stochastic process to obtain suitable state vectors.

Second, recursive state vector estimation permits modeling of dynamic systems, i.e. systems with a time varying state. This can be achieved by providing a state model that describes how a state vector changes from one point in time to another. To improve estimation results, current state variable measurements can be taken into account from time to time. Usually the dynamic model of a system does not reflect every aspect of the real relation between state vector estimates obtained at two different points in time. This error is often referred to as process noise.

The constraint can be variable for consecutive state vector estimation iterations. For instance, i.e. a first constraint is considered for a first state vector estimation iteration. A consecutive second state vector estimation iteration can then be obtained under consideration of a second constraint that is different from the first one.

If, for example, the state vector comprises a variable describing a position of a person on a corridor of a building, a first constraint for a first state vector estimation iteration can be based on a prior position estimate, a position initialization or a prior position measurement. A course of the walls that delimit the corridor that is known from a floor plan can then be used to derive a constraint for the state variable describing the position of the person on the corridor. The first state vector estimation iteration may lead to an estimated value of the state variable that indicates a change of position compared to the prior position estimate, the position initialization or the prior position measurement. Consequently, the course of the building walls in the vicinity of the position obtained by means of the first state vector estimation iteration may differ from that in the vicinity of the prior position. To increase estimation accuracy, it may thus be beneficial to adjust the constraint for a second state vector estimation iteration accordingly.

Of course, a variable constraint for consecutive state vector estimation iterations also encompasses the case that for a state vector estimation iteration no constraint is considered. This is advantageous if no suitable constraint can be derived from the map for the state vector estimation iteration. Furthermore, not considering a constraint can be utilized to speed up state vector estimation in cases where considering a constraint would cause a significant computational effort.

Dead reckoning is an example of a task suitable for being performed by recursive state vector estimation. It comprises estimation of the current position of an object based upon a previously determined position and updating that position based upon known speed, elapsed time and orientation. Additional position measurements can be taken into account for enhanced position estimation accuracy.

In another exemplary embodiment of all aspects of the present invention, the estimation of the state vector involves Kalman filtering. A Kalman filter bases estimation of a state vector on a prior estimate and a measurement. It is thus a recursive filter. For linear dynamic systems with white process and measurement noise, the Kalman filter is may be considered an optimal estimator. Every type of Kalman filter is suitable for being employed in the scope of the present invention. Kalman filters approximate the probability distribution of a state vector as a Gaussian distribution or as a mixture of Gaussian distributions. Among others, a Kalman filter can be an extended Kalman filter (EKF), an unscented Kalman filter (UKF), a second order extended Kalman filter (EKF2), a Gaussian mixture filter (GMF) or a sigma-point Kalman filter (SPKF). The computational complexity of Kalman filtering can be sufficiently low to be suitable for real-time applications. Furthermore, low computational needs of a Kalman filtering algorithm permit its execution on a platform with limited hardware resources, e.g. small memory capacities and a low central processing unit (CPU) frequency. This is often the case with portable devices such as mobile phones, personal digital assistants (PDAs), portable GNSS devices and many others.

In an exemplary embodiment of all aspects of the present invention, an estimate of the state vector that has been obtained in the estimation of the state vector under consideration of a constraint serves as a basis for a subsequent state vector estimation. This can be beneficial because it may contribute to increase the accuracy of consecutive estimates. In contrast to this embodiment of the present invention, other approaches to state vector estimation may incorporate a constraint for a first state vector estimation iteration and, for instance, output the derived state vector estimate to a user but not take into account the constrained estimate for consecutive state vector estimation iterations.

In an exemplary embodiment of all aspects of the present invention, in the estimation, at least two state vector estimates are calculated for one point in time and the first state vector estimate is characterized by a first probability density function, while the second state vector estimate is characterized by a second probability density function.

Referring to the example of a state vector of a person, wherein the state vector contains state variables related to the position of the person, it is obvious that two reasonable constraints can be imposed on the position of the person. A first assumption could be that the person is located outside of a building, while a second assumption could be that the person is located in the building. It is of course highly improbable that the person is located at the position of an outer wall of the building. A suitable constraint can thus be derived from a map that contains information on the course of the outer walls of the building. A first state vector estimate characterized by a first probability density function can then be calculated under consideration of a first constraint that limits the position of the person to outdoor locations, while a second state vector estimate characterized by a second probability density function can be calculated under consideration of a second constraint that limits the position of the person to indoor locations. The two state vector estimation threads (processing branches) can then be pursued separately, resulting in a more accurate first estimate if the person is in fact located outdoors, and in a more accurate second estimate if the person is in fact located indoors.

In an exemplary embodiment of the first apparatus according to the first aspect of the present invention, the first apparatus further comprises means for assigning a first weight to the first probability density function and for assigning a second weight to the second probability density function. The means may for instance comprise a processor that is configured to perform the assignment of the weights. The processor may for instance be the same processor that is configured to estimate the state vector and/or to derive the constraint and/or to truncate the probability density function.

In an exemplary embodiment of the second apparatus according to the first aspect of the present invention, the processor is further configured to assign a first weight to the first probability density function and to assign a second weight to the second probability density function, or the second apparatus further comprises a processor configured to assign a first weight to the first probability density function and to assign a second weight to the second probability density function.

In an exemplary embodiment of the second, the third, the fourth and the fifth aspect of the present invention, a first weight is assigned to the first probability density function and a second weight is assigned to the second probability density function.

The weights can measure the probability that the constraint underlying the calculation of the respective probability density function is valid for the real behavior of the object.

In an exemplary embodiment of all aspects of the present invention, a weight (e.g. the first and/or the second weight) corresponds to the probability mass of an unscaled truncated probability density function the probability density function truncated under consideration of the constraint is derived from or is identical to.

The probability mass is the integral value of the function. It is not only a measure that quantifies the suitability of the assumed constraint. As it may be needed anyway for scaling in a subsequent step, no additional effort is generated for determining the weight.

In an exemplary embodiment of all aspects of the present invention, a state vector estimate is discarded if the weight of the probability density function that characterizes it falls below a preset value. The lower the number of estimates, and thus the number of threads, to be pursued is, the lower the computational effort can be.

In an exemplary embodiment of all aspects of the present invention, in the estimation of the state vector, a weight is updated in an estimation iteration that follows an estimation iteration in which the weight has been initially assigned to a probability density function. Thus, the weight can reflect the probability that the constraint underlying the calculation of the probability density function is valid for the real behavior of the object with respect to the current estimate.

In an exemplary embodiment of all aspects of the present invention, different state models are assigned to the estimation of the first state vector estimate and to the estimation of the second state vector estimate. One of the advantages of this embodiment of the present invention is that the state model can then be adapted to the assumptions made by means of the underlying constraint, thus yielding enhanced estimation accuracy. A person, for instance, moving in a rocky outdoor environment is likely to cover a smaller distance in a fixed period of time than the same person does when moving indoors.

In an exemplary embodiment of all aspects of the present invention, the constraint that is considered for probability density function truncation matches at least two disconnected spaces and a probability density function is assigned to each of the disconnected spaces.

The support of a probability density function can be limited to any connected space. Thus, the properties of a constraint that is considered in probability density function truncation have to be transferred into a truncated probability density function having a support that matches a connected space. Using separate state vector estimation threads can overcome this problem by assigning a probability density function to each of the separate spaces.

For example, a constraint that matches two disconnected spaces can be decomposed into two state vector estimation threads with the first thread considering the constraint that matches the first space, and the second thread considering the constraint that matches the second space. It is then possible to pursue one of these threads or to discard it based on a weight assigned to it.

In an exemplary embodiment of all aspects of the present invention, the constraint is a linear constraint. Linear constraints may be formulated as $n^T x \leq \beta$, where n is a vector of coefficients, x is a state vector and $\beta$ is a constant. Linear constraints are easy to compute. Such a constraint matches a connected space in the state space. Due to their simplicity, considering linear constraints can be achieved efficiently and thus allows for the use in the scope of real-time applications. Linear constraints may be easily obtained from maps that use vector graphics. If, for instance, the map is a map containing information on the course of the outer walls of a building and in the present estimation task the position of an object has to be limited to indoor locations, it is sufficient if only the vertices (corners) of building are known to compute the corresponding linear constraints based on them.

It is of course possible to linearize a nonlinear constraint to profit from the advantages of linear constraints.

In another exemplary embodiment of all aspects of the present invention, the state vector is described by means of a probability density function of a preset class of probability density functions. It is not a precondition for the present invention that the preset class of probability density functions used for description of the state vector is the optimal choice for the present application with respect to the real distribution of the state variables. Other characteristics of the preset class of probability density functions may be taken into account. For example, a specific class of probability density functions may be especially well suited for quick calculation of its statistical values. In general, a preset class of probability density functions may yield simplified calculation of statistical values such as the mean or the covariance matrix of the state vector because it is not necessary to determine a suitable probability density function in a preceding step. An exemplary class of probability density functions is the class of Gaussian probability density functions. In this exemplary case, to describe a specific probability density function belonging to the class, the mean and the variance or the covariance matrix of the function must be provided as additional parameters.

In an exemplary embodiment of all aspects of the present invention, the probability density function is Gaussian. The moments of a Gaussian probability density function can be calculated efficiently.

Even if the class of the probability density function that characterizes a state vector estimate is known or a least a preset class is assumed, the truncated function does not necessarily have to belong to that class, too. For example, a truncated Gaussian probability density function is not Gaussian because it does not have infinite support. In consequence, the advantages outlined above may not be present anymore.

In an exemplary embodiment of all aspects of the present invention, a probability density function of the preset class of probability density functions is derived from the truncated probability density function or properties thereof. This is allows for regaining the advantages of assuming a probability density function of a preset class for subsequent processing steps or subsequent estimation iterations. To illustrate the above embodiment, the example of a truncated Gaussian probability density function can be referred to. Its mean and its variance, or covariance matrix in case of a multivariate distribution, can be determined. These values can then be considered as parameters of another Gaussian probability density function with infinite support. This function does not necessarily satisfy the constraint. Nevertheless, it has been affected by it so that undesired state vectors may at least exhibit a reduced probability. Of course, as set forth above, it is not a precondition for deriving a probability density function of the preset class of probability density functions from properties of the truncated probability density function that the truncation of the probability density function is performed. Its properties can also be determined by exploiting a known relation between the properties of the truncated probability density function that are to be obtained and the corresponding properties or other properties of the untruncated probability density function, wherein the relation is at least partially determined by the constraint.

In an exemplary embodiment of the first apparatus according to the first aspect of the present invention, the first apparatus further comprises means for deriving properties of the truncated probability density function of the state vector from properties of the probability density function that can be truncated to obtain the truncated probability density function. The means may for instance comprise a processor that is configured to perform the deriving of the properties of the truncated probability density function. The processor may for instance be the same processor that is configured to derive the constraint and/or to truncate the probability density function and/or to estimate the state vector and/or to assign the weights.

In an exemplary embodiment of the second apparatus according to the first aspect of the present invention, the processor is further configured to derive properties of the truncated probability density function of the state vector from properties of the probability density function that can be truncated to obtain the truncated probability density function, or the second apparatus further comprises processor is further configured to derive properties of the truncated probability density function of the state vector from properties of the probability density function that can be truncated to obtain the truncated probability density function.

In an exemplary embodiment of the second, the third, the fourth and the fifth aspect of the present invention, additional method steps, modified computer program code or additional instructions stored on a readable storage medium can be employed to derive properties of the truncated probability density function of the state vector from properties of the probability density function that can be truncated to obtain the truncated probability density function.

An advantage of deriving properties of the truncated probability density function of the state vector from properties of the probability density function that can be truncated to obtain the truncated probability density function is that consideration of a constraint can be easily integrated into existing state vector estimation approaches that have initially been designed to not take a constraint into account because the actual truncation of the probability density function does not have to be carried out. Instead, the properties of the truncated probability density function can be derived in a step following the computation of the corresponding properties of the untruncated probability density function.

In an exemplary embodiment, the first and the second apparatus according to the first aspect of the present invention comprise an antenna. One of the advantages of this embodiment is that an antenna may allow wireless communication with other devices.

In an exemplary embodiment, the first and the second apparatus according to the first aspect of the present invention is a navigation device, such as a GPS device, and comprise a display. The display allows, for instance, to display the map and highlight the position of the user thereon. Of course the device may further comprise an antenna as well.

The exemplary embodiments described above for all aspects of the invention shall be understood to be disclosed in all possible combinations with each other.

It is to be noted that the above description of embodiments of the present invention is to be understood to be merely exemplary and non-limiting.

These and further aspects of the invention will be apparent from and elucidated with reference to the detailed description presented hereinafter.

DETAILED DESCRIPTION OF EXEMPLARY EMBODIMENTS OF THE INVENTION

Figure 1:
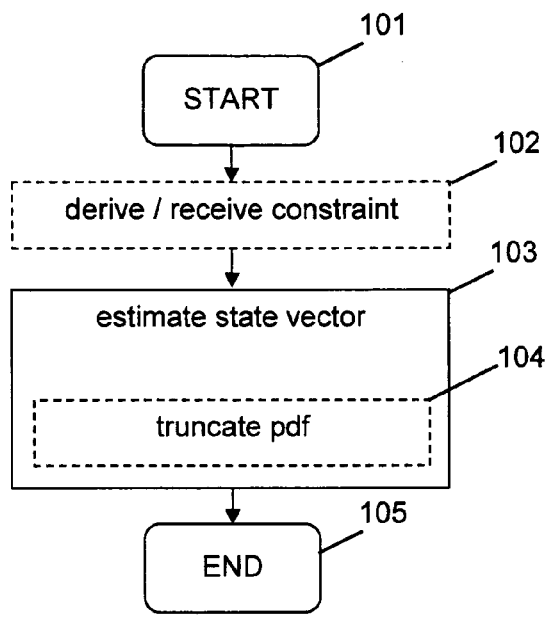
FIG. 1: a flowchart of a first exemplary embodiment of a method according to the second, the third and the fifth aspect of the present invention.

In the following detailed description, exemplary embodiments of the present invention will be described in the context of position estimation. It is however emphasized that deployment of the present invention for this type of purpose is of exemplary nature only, since the present invention is equally well suitable for various other state vector estimation applications.

Exemplary embodiments of the present invention exploit restrictive information extracted from maps to improve positioning in Kalman-type filters using probability density function truncation.

In mobile positioning applications the position of a mobile device in a given coordinate system may be estimated, and the estimate is for instance plotted on a 2- or 3-dimensional map. To obtain the best accuracy, the estimation may be carried out in a recursive manner, so that the current state estimate depends on the previous state estimates. This problem can be formulated as a filtering problem, and in order to be solved in real time, Kalman-type filters (EKF, EKF2, SPKF, GMF) can be used.

It is possible to extract restrictive information from maps that could be used to improve the recursive estimation. The restrictive information may be for example outer walls of the neighboring buildings, roads, water courses, cliffs or other restricted areas where the user cannot or has a negligible probability to move into from the previous location.

Exemplary embodiments of the present invention diversify the use of maps, in particular but not restricted to indoor positioning using outer walls of buildings.

Exemplary embodiments of the present invention convert the neighboring areas into a likelihood function based on the map and the previous state of the user. The state may for instance consist of the position and velocity of the user, but may also contain some other parameters e.g. parameters indicating if the user is indoors or outdoors, or what type of transportation the user is using (car, ship, plane, bicycle, pedestrian, etc.).

In exemplary embodiments, relevant parts of the likelihood function are approximated as linear constraints, and the linear constraints are incorporated in Kalman-type filters.

The linear constraints are easy to compute, and the computation may then for instance be carried out in real time.

The accuracy of traditional Global Navigation Satellite Systems (GNSS) positioning devices may degrade significantly in dense urban areas and indoor environments. With some classification methods, the user may, to some extent, be classified as moving by car, ship, plane, bicycle or walking.

Furthermore, the user may be classified as being indoors or outdoors. This knowledge combined with the information extracted from maps may be used to improve the position estimate.

Even if this classification cannot be done, it is possible to use exemplary embodiments of the present invention to compute the probability density functions (pdf) for all or some of these cases. These pdfs, which may be referred to as "components", may be assigned different state models and weights. Without drastically increasing the computational or memory requirements, all of the components may be kept track of until some of the weights are negligible, and thus these components may be discarded. It is also possible to merge components that are "close" to each other in some sense to decrease the computational and memory requirements.

Exemplary embodiments of the present invention improve significantly the performance of radio signal based positioning systems in indoor environments and also in dense urban outdoor environments.

Map-aided outdoor positioning systems may be used, for instance in cars and trains, using the knowledge that the device has to be located on a road or railroad respectively. The drawback of this kind of systems is, however, that the map may only be used to project the position estimate to a desired space (roads, railroads), and this does not account for the fact that changing the position estimate should affect the whole state estimate.

According to exemplary embodiments of the present invention, all possible information, in particular, the outer walls of buildings, are used to improve positioning particularly in dense urban areas and indoor environments. Compared to existing indoor positioning systems, in exemplary embodiments of the present invention, no calibration is needed. The restrictive information may be computed in real time. Compared to systems mounted in cars, trains, etc., exemplary embodiments of the present invention are suitable also for positioning of pedestrians, ships, bicycles, etc.

Another advantage of exemplary embodiments of the present invention is that the whole state is affected and not only the position of the user, thus also improving the subsequent estimates.

The below-described implementation of exemplary embodiments of the present invention may also account for numerical errors that occur often if the unconstrained state estimate is "far" from the restrictive planes.

Like all positioning methods that compute the position estimate in a finite amount of time, exemplary embodiments of the present invention may produce approximation errors. However, these approximation errors are small and negligible compared to the improvements achieved by these exemplary embodiments of the present invention.

Exemplary embodiments of the present invention may be incorporated to all positioning systems that use Gaussian probability densities to represent the state of the user. One example of such systems are systems that use Kalman-type filters to infer the user's state.

Exemplary embodiments of the present invention do not require that the pdfs are Gaussian; pdf truncation may be used for all pdfs.

In the following description of exemplary embodiments of the present invention, however, only the implementation for Gaussian pdfs is considered, since they are usually used in positioning systems.

One way to implement exemplary embodiments of the present invention is to use methods to compute the state estimates and to use probability density function truncation as the final step in the algorithm.

FIG. 1 shows a flowchart of a first exemplary embodiment of a method according to the second aspect of the present invention. This method may for instance be performed by processor 904 (see FIG. 9) or its functional components.

Step 101 is the starting point. Optional step 102 comprises deriving a constraint for a state variable related to a position or an orientation of an object from a map or it comprises receiving such a constraint.

In subsequent step 103 a constraint derived from a map for a state variable related to a position or an orientation of an object that has either been derived or received in step 102 or is provided otherwise, is considered in estimation of a state vector that comprises the state variable related to a position or an orientation of the object based on at least one of a probability density function of the state vector truncated under consideration of the constraint for the state variable or properties of the truncated probability density function.

Step 103 may optionally comprise step 104. In the latter step, the actual truncation of a probability density function of the state vector under consideration of the constraint is performed. Step 104 may not be needed if estimation of the state vector is based only on properties of the truncated probability density function, and not on the truncated probability density function itself. In this case, step 104 may be replaced by a step of determining properties (e.g. moments) of the truncated probability density function.

In step 105, the process terminates.

In the following, some principles of state vector estimation based on truncated probability density functions (or properties thereof) will be explained with reference to FIGS. 2-6.

Figure 2:
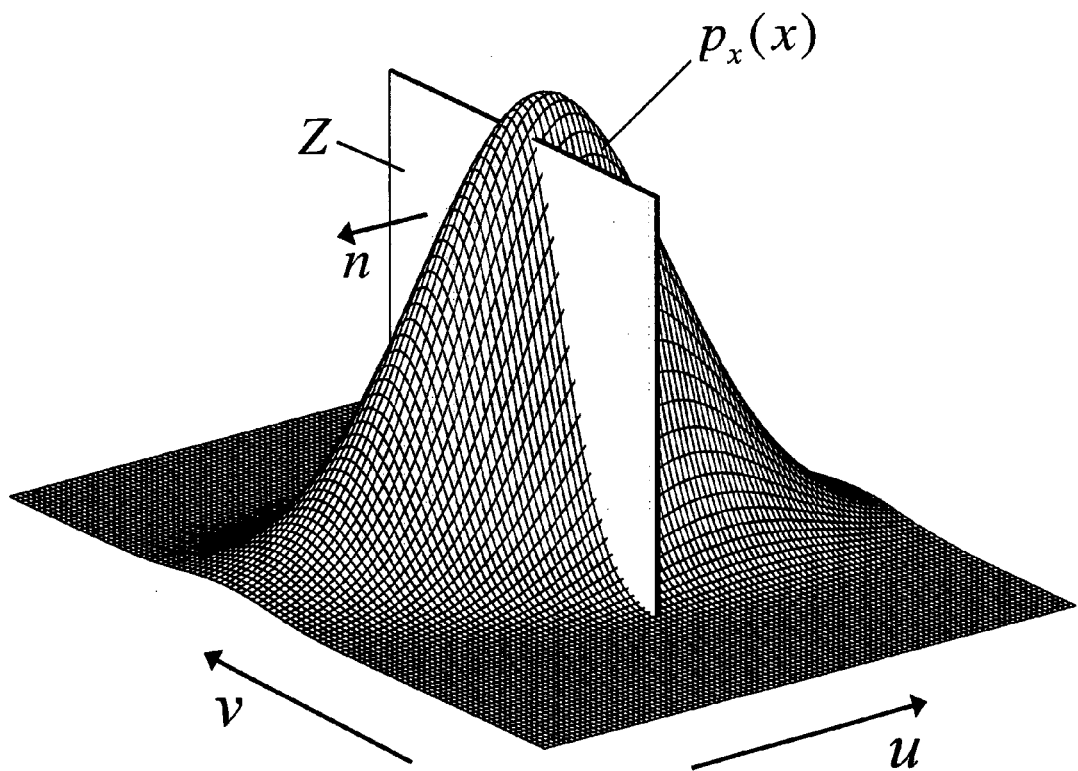
FIG. 2: An exemplary Gaussian probability density function of a state vector estimate and a constraint, represented by a restrictive plane, that has not yet been incorporated.

FIG. 2 illustrates an exemplary Gaussian probability density function $p_x(x)$ of a state vector estimate and a constraint, represented by a restrictive plane Z, that has not yet been considered.

The probability density function $p_x(x)$ is Gaussian with mean $\mu$ and covariance matrix $\Sigma$. In the present example, the state vector x that is subject to estimation is composed of the two state variables u and v. They describe the position of an object. The constraint that has to be considered is in this exemplary case a linear constraint. It may thus be written as $n^T x \leq \beta$, where n is a vector of coefficients, x is the state vector and $\beta$ is a constant. Although in the present example a constraint is only imposed on the state variable u, a constraint could of course be imposed on state variable v or on both state variables at the same time equally well. The vector of coefficients n, can be understood as a normal vector of the plane Z that is employed in the present example to visualize the constraint.

Denote $$m = \frac{n}{\sqrt{n^T \Sigma n}}, \quad (1)$$

$$l = \frac{\beta}{\sqrt{n^T \Sigma n}} - m^T \mu. \quad (2)$$

The connected space A defines the domain where the probability density function $p_x(x)$ describing the state vector is not set to zero due to probability density function truncation. It is characterized by the following equation:

$$A = \{x | l \leq m^T (x - \mu)\}. \quad (3)$$

In the present example, state vector estimation is performed recursively by means of a Kalman filter. The probability density function $p_x(x)$ depicted in FIG. 2 may have either been initially provided or it may have been computed in a prior estimation iteration that did or did not consider a constraint. Truncation can then be illustrated by the following equations. The probability mass of the truncated probability density function is denoted with a which is given by $$\alpha = \int_A p_x(\xi) d\xi = \Phi(l) \quad (4)$$

with ($\Phi$) being the standard normal cumulative density function.

The truncated probability density function $p_x'(x)$ is then given by $$p_x'(x) = \begin{cases} \frac{1}{a} p_x(x), \forall x \in A \\ 0, \forall x \in A \end{cases}. \quad (5)$$

Multiplication by the reciprocal value of the probability mass $\alpha$ serves for scaling the truncated probability density function $p_x'(x)$ so as to secure that it integrates to one. If the estimate of the state vector that has been obtain under consideration of a constraint and is described by $p_x'(x)$ does not serve as a basis for a subsequent state vector estimation, the algorithm may stop at this point.

In this example, knowing that the probability density function is Gaussian and using a Kalman filter, it is sufficient to calculate the mean and the covariance matrix of the truncated probability density function to enable calculating a consecutive state vector estimate.

The mean of the truncated probability density function $p_x'(x)$ is denoted by $\hat{\mu}$ and its covariance matrix is denoted by $\hat{\Sigma}$. The mean of the truncated probability density function is then given by $$\hat{\mu} = \int_A \xi \frac{p_x(\xi)}{a} d\xi, \quad (6)$$

and the covariance matrix is given by $$\hat{\Sigma} = \int_A (\xi - \hat{\mu})(\xi - \hat{\mu})^T \frac{p_x(\xi)}{a} d\xi. \quad (7)$$

Using the above formulas, the statistical properties $\hat{\mu}$ and $\hat{\Sigma}$ of the truncated probability density function $p_x'(x)$ can be calculated directly without prior computation of the corresponding values $\mu$ and $\Sigma$ of the original probability density function $p_x(x)$. On the other hand, $\mu$ and $\Sigma$ can be used in calculating $\hat{\mu}$ and $\hat{\Sigma}$.

Denote $$\varepsilon = -\frac{e^{-\frac{1}{2}l^2}}{\sqrt{2\pi} \ a}. \quad (8)$$

The mean $\hat{\mu}$ of the truncated probability density function $p_x'(x)$ is then given by $$\hat{\mu} = \mu + \Sigma m \varepsilon, \quad (9)$$

while the covariance matrix $\hat{\Sigma}$ is given by $$\hat{\Sigma} = \Sigma - \Sigma m(-l\varepsilon + \varepsilon^2) m^T \Sigma. \quad (10)$$

In other words, properties of the truncated probability density function $p_x'(x)$ can be derived from properties of the probability density function $p_x(x)$ that can be truncated to obtain the truncated probability density function. An advantage of calculating $\hat{\mu}$ and $\hat{\Sigma}$ from $\mu$ and $\Sigma$ is that considering a constraint can be easily integrated into existing state vector estimation approaches that have initially been designed to not take a constraint into account by providing additional capacities for solving equations (1), (2), (4), (8), (9), and (10). The actual truncation of the probability density function $p_x(x)$ does not have to be carried out.

For example, the first apparatus according to the first aspect of the present invention can be provided with means for calculating $\hat{\mu}$ and $\hat{\Sigma}$ from $\mu$ and $\Sigma$. The processor of the second apparatus according to the first aspect of the present invention can be configured to compute $\hat{\mu}$ and $\hat{\Sigma}$ from $\mu$ and $\Sigma$. According to the second, the third, the fourth and the fifth aspect of the present invention, additional method steps, modified computer program code or additional instructions for a processor can be employed to compute $\hat{\mu}$ and $\hat{\Sigma}$ from $\mu$ and $\Sigma$.

Numerical problems might arise if the probability mass $\alpha$ of the truncated probability density function $p_x'(x)$ is close to zero. If the method of this embodiment of the present invention is implemented using a processor, the probability mass $\alpha$ might get rounded to zero due to the limited accuracy of floating point representation. Using $$\hat{\mu}_{\alpha=0} = \mu + \Sigma m l \quad (11)$$

for computation of the mean and $$\hat{\Sigma}_{\alpha=0} = \Sigma - \Sigma m m^T \Sigma \quad (12)$$

for computation of the covariance matrix, this problem can be overcome. The use of the above formulae may be justified by noting that $$\lim_{l \to -\infty} (\hat{\mu} - \hat{\mu}_{\alpha=0}) = 0 \quad (13)$$

$$\lim_{l \to -\infty} \hat{\Sigma} = \hat{\Sigma}_{\alpha \approx 0} \quad (14)$$

Figure 3:
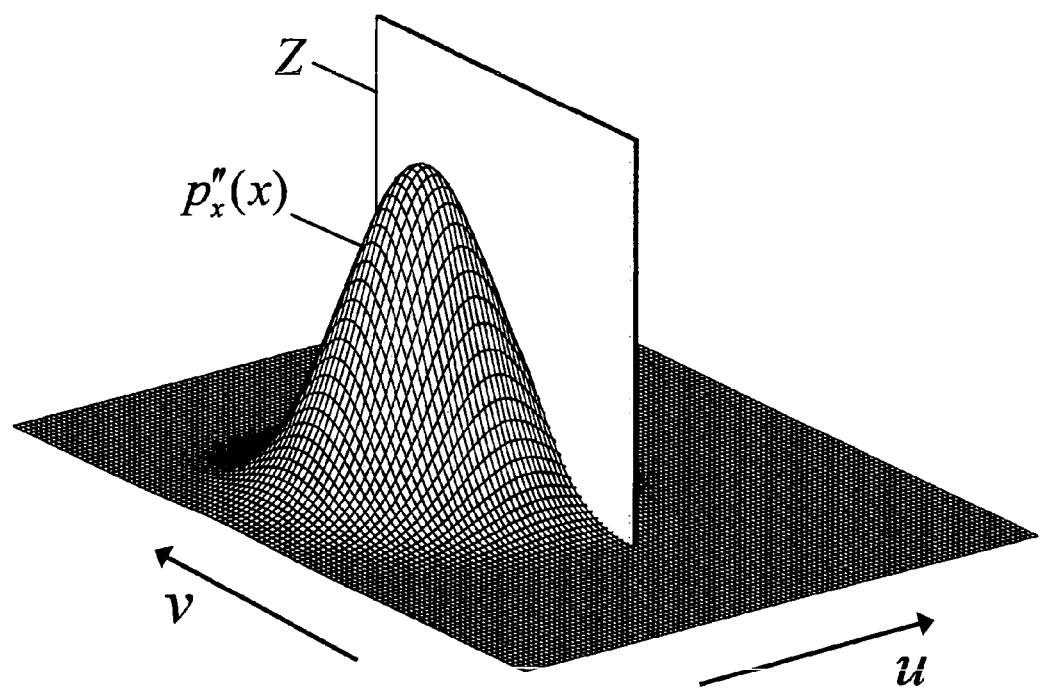
FIG. 3: a Gaussian probability density function that has been derived from a truncated probability density function that was generated from the Gaussian probability density function of FIG. 2 by considering a first constraint represented by the restrictive plane.

FIG. 3 illustrates an exemplary Gaussian probability density function $p_x''(x)$ that has been derived from a truncated probability density function that was generated from the Gaussian probability density function $p_x(x)$ of FIG. 2 by considering a first constraint represented by the restrictive plane Z.

As already mentioned, the state variables of the present example describe the position of an object. The restrictive plane Z can be considered as an outer wall of a building and it is assumed that the area to the left of the wall is an indoor area, while the area to the right is an outdoor area. It can be derived from FIG. 2 that almost half of the probability mass of the probability density function $p_x(x)$ corresponds to the object being located inside the building. The first constraint of the present example limits the state variable u, that describes the position of the object in a direction orthogonal to the restrictive plane, to indoor locations. Having obtained a truncated probability density function that satisfies the constraint but does not belong to the class of Gaussian probability density functions anymore, a Gaussian probability density function $p_x''(x)$ is derived from the truncated probability density function using the mean and the covariance matrix of the truncated function as the corresponding parameters of the derived Gaussian probability density function $p_x''(x)$. Compared to FIG. 2, the maximum of the probability density function $p_x''(x)$ has been shifted towards the indoor side of the wall represented by the restrictive plane Z, i.e. to the left side of it. The larger part of the probability mass of the probability density function $p_x''(x)$ corresponds to the object being located inside the building.

Figure 4:
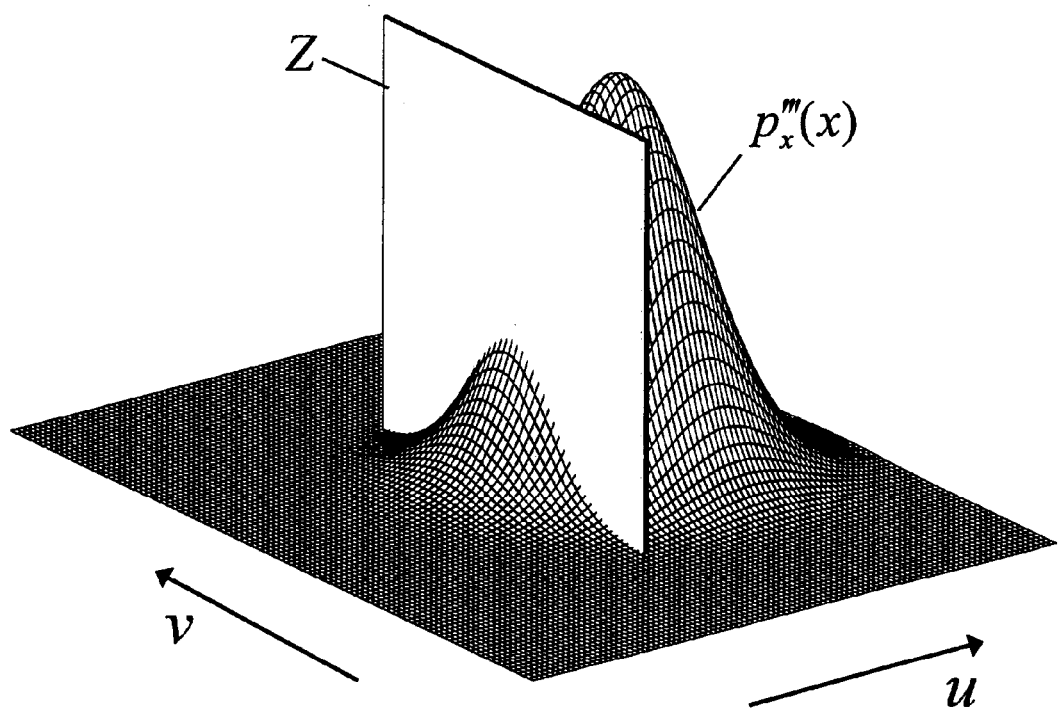
FIG. 4: a Gaussian probability density function that has been derived from a truncated probability density function that was generated from the Gaussian probability density function of FIG. 2 by considering of a second constraint represented by the restrictive plane.

FIG. 4 illustrates an exemplary Gaussian probability density function $p_x'''(x)$ that has been derived from a truncated probability density function that was generated from the Gaussian probability density function $p_x(x)$ of FIG. 2 by considering a second constraint represented by the restrictive plane Z.

The second constraint of the present example limits the state variable u to outdoor locations. In FIG. 4 it can be seen that according to the Gaussian probability density function $p_x'''(x)$ that has been derived from the truncated probability density function the probability of the object being located at a position to the left of the restrictive plane Z is not zero. Compared to FIG. 2, it is obvious that the maximum of the probability density function $p_x'''(x)$ has nevertheless been shifted towards the outdoor side of the wall represented by the restrictive plane Z, i.e. to the right side of it. The larger part of the probability mass of the probability density function $p_x'''(x)$ corresponds to the object being located outside the building.

Figure 5:
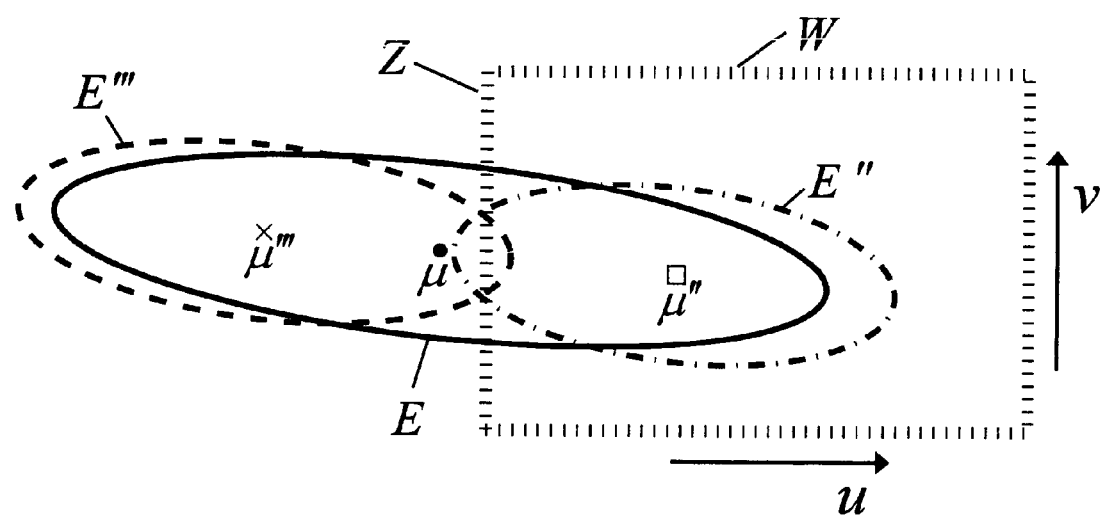
FIG. 5: the restrictive plane of FIGS. 2 to 4 in a top view along with the means of the probability density functions of FIGS. 2 to 4 and their confidence ellipses.

FIG. 5 illustrates the restrictive plane Z of FIGS. 2 to 4 in a top view along with the means μ, μ' and μ''' of the probability density functions $p_x(x)$, $p_x''(x)$ and $p_x'''(x)$ of FIGS. 2 to 4 and their confidence ellipses E, E'' and E'''. Note that in this figure, the indoor locations lie on the right side of the restrictive plane Z.

The confidence ellipses E, E'' and E''' can be obtained from the respective covariance matrices. They represent the intervals centered at the respective mean in which the factual state vector will lie with a probability of 0.683.

The reference sign W denotes another wall of the building. In the present example this wall is not used to derive a constraint for state vector estimation.

Again, it can be derived from FIG. 5 that the mean μ, marked with a dot in the figure, of the probability density function $p_x(x)$ that describes a state vector that has been obtained without considering a constraint is close to the restrictive plane Z. The associated confidence ellipse E shows that it is nearly equally probable that the factual position of the object is inside or outside the building.

The mean μ'', marked with a rectangle in the figure, of the probability density function $p_x''(x)$ is clearly located on the inside of the building. The associated confidence ellipse E'' shows that in the majority of cases the state vector estimate will indicate a position of the object inside the building. As explained before, the probability assigned to the object being located outside the building is not zero. This is due to the fact that $p_x''(x)$ is not the truncated probability function, but a Gaussian probability density function derived from it.

The mean μ''', marked with a cross in the figure, of the probability density function $p_x'''(x)$ is clearly located on the outside of the building. The associated confidence ellipse E''' shows that in the majority of cases the state vector estimate will indicate a position of the object outside of the building. As explained before, the probability assigned to the object being located inside of the building is not zero. This is due to the fact that $p_x'''(x)$ is not the truncated probability function, but a Gaussian probability density function derived from it.

It is of course possible to calculate both probability density functions $p_x''(x)$ and $p_x'''(x)$ by considering the first and the second constraint one after another. Thus, two different state vector estimates, characterized by $p_x''(x)$ and $p_x'''(x)$ respectively, are calculated for one point in time.

Moreover, a first weight can be assigned to $p_x''(x)$ and a second weight can be assigned to $p_x'''(x)$. The weights can measure the probability that the constraint underlying the calculation of the probability density function is valid for the real behavior of the object.

For example, a weight can correspond to the probability mass of an unscaled truncated probability density function the probability density function truncated under consideration of the constraint is derived from or is identical to. In other words, the probability mass of the truncated probability density function that has been derived from $p_x(x)$ but that has not yet been scaled to secure that the scaled truncated probability density function integrates to one, can be used as a weight. The probability mass is not only a measure that quantifies the suitability of the assumed constraint. As it may be needed anyway for scaling in a subsequent step, no additional effort may be generated for determining the weight.

Figure 6:
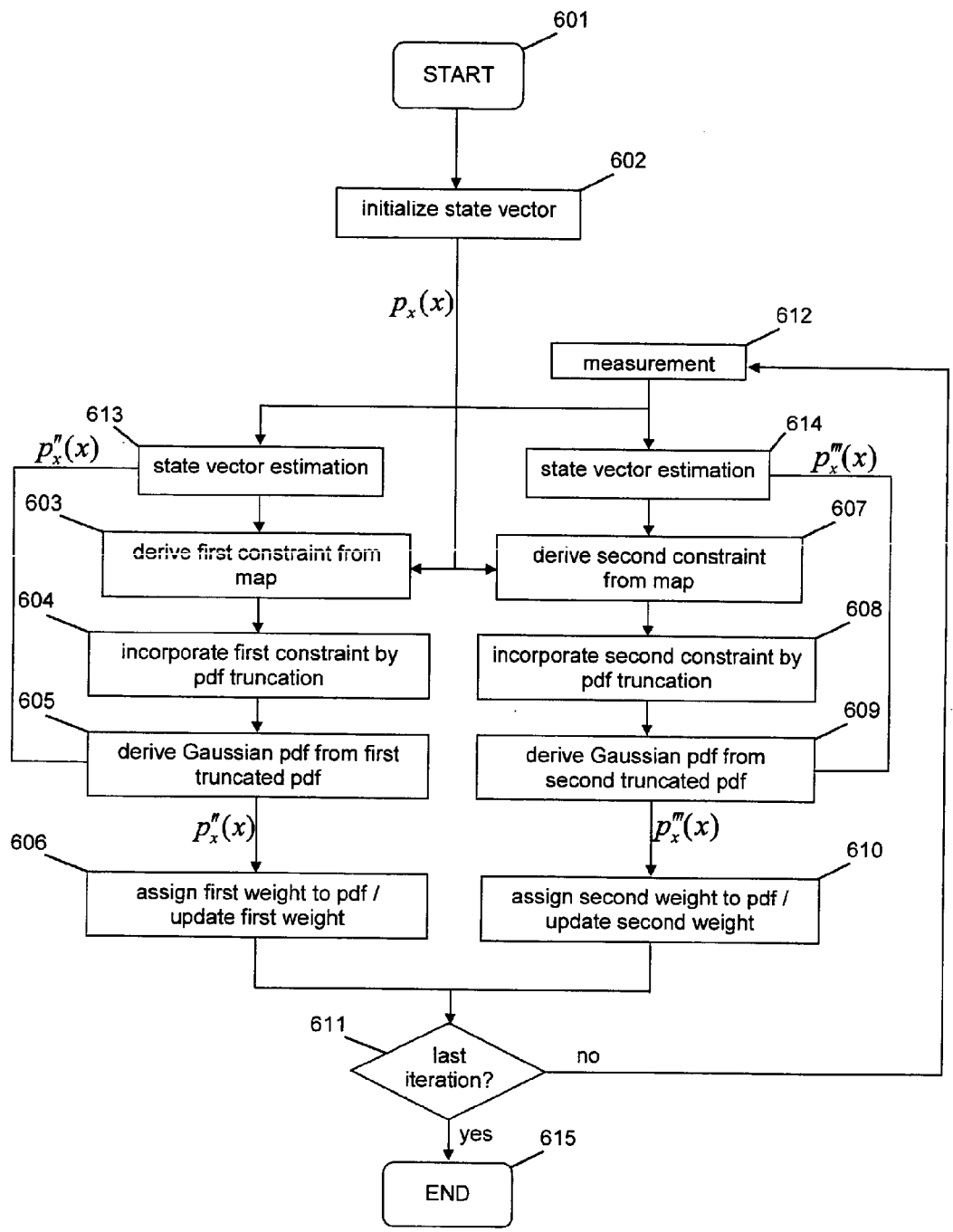
FIG. 6: a flowchart of a second exemplary embodiment of a method according to the second, the third and the fifth aspect of the present invention explained with reference to the scenario depicted in FIGS. 2 to 5.

FIG. 6 shows a flowchart of a second exemplary embodiment of a method according to the second aspect of the present invention explained with reference to the scenario depicted in FIGS. 2 to 5. This method may for instance be performed by processor 904 (see FIG. 9) or its functional components.

Step 601 is the starting point. Step 602 comprises initializing the state vector as a basis for subsequent estimation steps by using the Gaussian probability density functions $p_x(x)$ to characterize the initial state vector. In step 603 a first constraint for the state vector is derived from the map. The constraint is considered in state vector estimation by truncating $p_x(x)$ in step 609. As the truncated function is not Gaussian anymore, a Gaussian probability density function $p_x''(x)$ is derived from the truncated function by calculating its mean and its covariance matrix and using them as the corresponding parameters of a Gaussian function in step 605. Subsequently, a first weight is assigned to $p_x''(x)$. The weight measures the probability that the constraint underlying the calculation of the probability density function is valid for the real behavior of the object. Steps 603 to 606 form a first state vector estimation thread and $p_x''(x)$ is a first probability density function. Steps 607 to 610 are similar to steps 603 to 606 and form a second state vector estimation thread. Instead of the first, a second constraint is considered and thus the second probability density function $p_x'''(x)$ is computed. Steps 603 to 606 and steps 607 to 610 may either be executed in parallel or consecutively. Having performed steps 603 to 610, step 611 is executed. It is checked, whether the current state vector estimation iteration is intended to be the last iteration. If this check yields a positive result, the process terminates at step 615.

In case of a negative result, a noisy state vector measurement is obtained in step 612. Step 613 forms part of the first state vector estimation thread, while step 614 forms part of the second thread. As the control flow is similar for both threads, the following explanations are given with reference to the first thread only. By taking into account the measurement of step 612 and the prior state vector estimate that is described by $p_x''(x)$, a new state vector estimate is obtained in step 613. Hence, the state vector estimation is performed recursively and on the basis of an estimate of a state vector that has been obtained in state vector estimation under consideration of a constraint. The constraint that is considered in the following step 603 can either be the same as that of the first iteration or it can be different. After incorporating the constraint in step 604 and deriving another Gaussian probability density function, again referred to as $p_x''(x)$, from the truncated probability density function in step 605, the weight assigned to it is updated in step 606. If the weight falls below a preset value, the state vector estimate that is characterized by $p_x''(x)$ can be discarded. The lower the number of state vector estimates and thus the number of estimation threads to be pursued is, the lower the computational effort can be.

If the result of the check performed in step 611 is negative, another state vector estimation iteration is performed. If the result of the check performed in step 611 is positive, the method illustrated by the flowchart of FIG. 6 ends as indicated by reference numeral 615.

Figure 7:
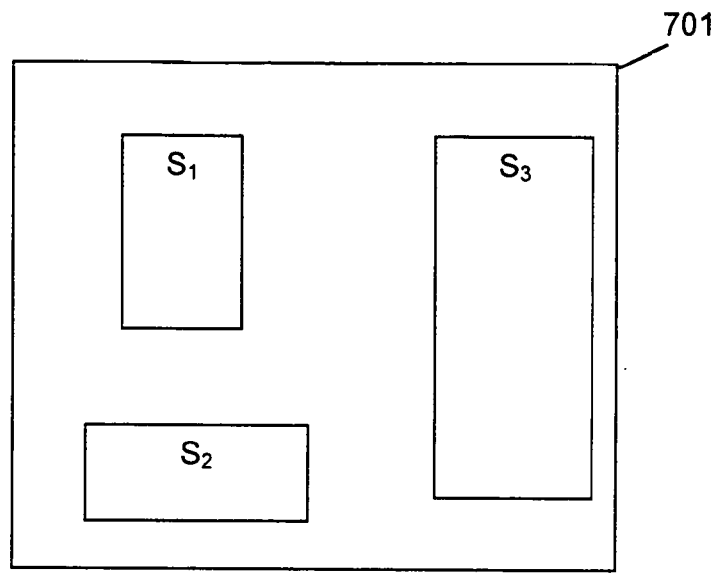
FIG. 7: a schematic illustration of an example of a map with three separate connected spaces marked therein.

FIG. 7 is a schematic illustration of an example of a map 701 with three separate connected spaces $S_1$, $S_2$ and $S_3$ marked therein.

Again, the map 701 shows the outlines of buildings. In the present example, it is assumed that the object of which a state vector has to be estimated is located in a building, namely in one of the areas $S_1$, $S_2$ and $S_3$. To consider this constraint by probability density function truncation, three separate state vector estimation threads are employed because the areas $S_1$, $S_2$ and $S_3$ do not form part of a unitary connected space. The first estimation thread considers the constraint that corresponds to the assumption that the object is located in area $S_1$, the second estimation thread considers the constraint that corresponds to the assumption that the object is located in area $S_2$ and the third estimation thread considers the constraint that corresponds to the assumption that the object is located in area $S_3$. Thus, to each of the spaces $S_1$, $S_2$ and $S_3$ a probability density function is assigned. It is then possible to pursue one of these threads or to discard it based on a weight assigned to a probability density function belonging to an estimate of this thread. It is noted that limiting the position of the object to one of the areas $S_1$, $S_2$ and $S_3$ corresponds to imposing a constraint on at least two state variables related to two positions along two axes orthogonal to one another.

Figure 8:
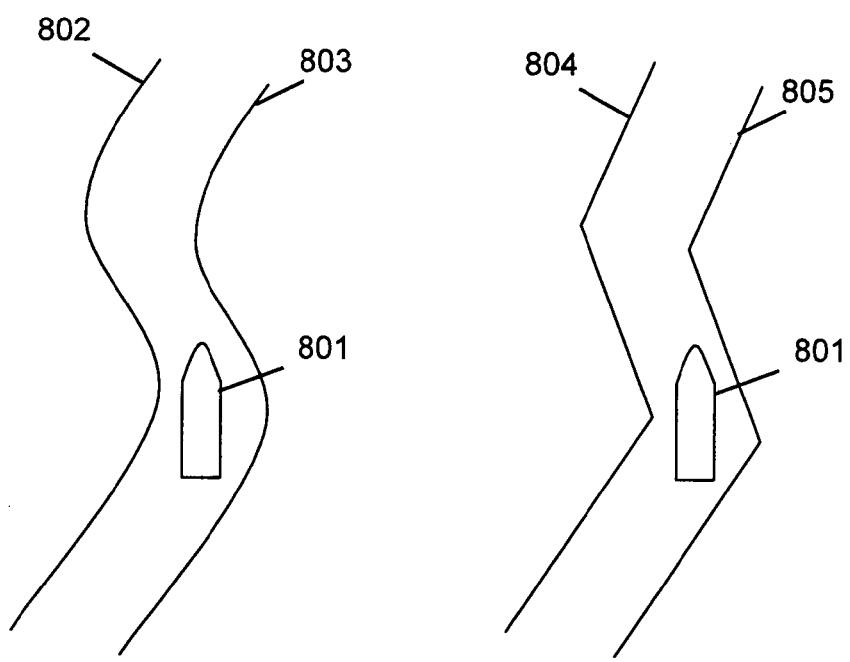
FIG. 8: a schematic illustration of an example for constraint linearization explained with reference to estimation of the position of a boat.

FIG. 8 is a schematic illustration of an example for constraint linearization explained with reference to estimation of the position of a boat 801. Constraint linearization may for instance be part of the method steps 102 (see FIG. 1) or 603/607 (see FIG. 6) and may be implemented by processor 904 (see FIG. 9) or its functional components.

The boat 801 is located on a river. In the left drawing, the course of the river is visualized by the curves 802 and 803. In the present example, the constraint that is imposed on the state vector that contains a state variable related to the position of the boat 801 is that the boat has to be located on the river. As the course of the river cannot be described by a linear constraint, the constraint is linearized, i.e. approximated, by the connected line segments 804 and 805 as shown in the right drawing. Subsequently, the linear constraint is incorporated into state vector estimation. Thus, it can be profited from the benefits of linear constraints. Due to their simplicity, incorporating linear constraints can be achieved efficiently and thus allows for the use in the scope of real-time applications.

Figure 9:
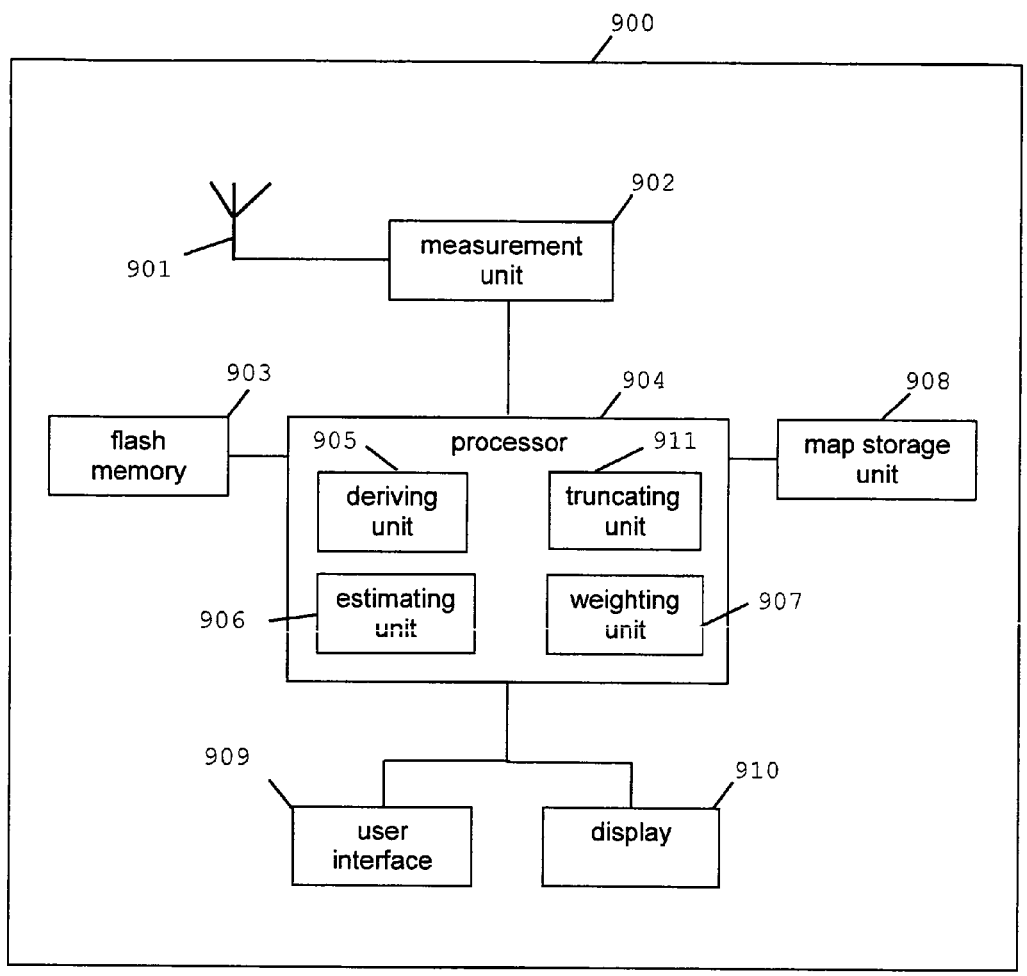
FIG. 9: a schematic illustration of an embodiment of an apparatus according to the present invention.

FIG. 9 is a schematic illustration of an embodiment of an apparatus 900 according to the present invention.

The apparatus 900 is a navigation device. It comprises an antenna 901, a measurement unit 902, a flash memory 903, a processor 904, a map storage unit 908, a user interface 909 and a display 910. The antenna 901 is connected to the measurement unit 902. The measurement unit 902, the flash memory 903, the map storage unit 908, the user interface 909 and the display 910 are electrically connected to the processor 904.

Flash memory 903 stores code that, when run on processor 904, causes processor 904 to estimate a state vector of an object on which the navigation device 900 is mounted on. Therein, the state vector comprises a state variable related to a position or an orientation of the object. The estimation of the state vector is based on at least one of a probability density function of the state vector truncated under consideration of a constraint for the state variable derived from the map stored on map storage unit 908 and properties of the truncated probability density function. The code may further comprise instructions that cause processor 904 to read a map or a part thereof from map storage unit 905, to derive a constraint from the read map, to truncate a probability density function according to the derived constraint, to weight a probability density function, and to consider measurement from measurement unit 902 in state vector estimation.

The antenna 901 serves for navigation signal reception, for instance for GPS or Galileo signal reception. Measurement unit 902 uses these signals to obtain a position measurement.

The user interface 909 and the display 910 allow a user to interact with navigation device 900. In particular, the user interface 909 may serve for providing commands to the navigation device 900 and the display 910 may serve for displaying the map and the estimated position of the object thereon.

The processor 909 is configured to run the code stored in flash memory 903 to perform the method steps of the flowcharts of FIG. 1 or FIG. 6.

In the exemplary setup of FIG. 9, processor 904 comprises further functional components that perform specific tasks, inter alia a deriving unit 905, an estimating unit 906 and a weighting unit 907, and a truncating unit 911.

Deriving unit 905 derives a constraint for the state variable related to a position of the object from the map that is read from map storage 908.

Estimating unit 906 estimates a state vector of the object, wherein the state vector comprises the state variable related to the position of the object. The estimation is based on at least one of a probability density function of the state vector truncated under consideration of the constraint (as for instance output by the truncating unit) and properties of the truncated probability density function (as for instance output by the unit that determines properties of the truncated probability density function).

Weighting unit 907, in the case that in the estimation of the state vector at least two state vector estimates are calculated for one point in time and the first state vector estimate is characterized by a first probability density function, while the second state vector estimate is characterized by a second probability density function, assigns a first weight to the first probability density function and assigns a second weight to the second probability density function.

Truncating unit 912 truncates a probability density function under consideration of a constraint, or determines properties (e.g. moments) of a truncated probability density function (wherein an actual calculation of the truncated probability density function may not be necessary to determine its properties).

The apparatus 900 can be a module that forms part or is to form part of another apparatus or it can be a separate apparatus.

Figure 10:
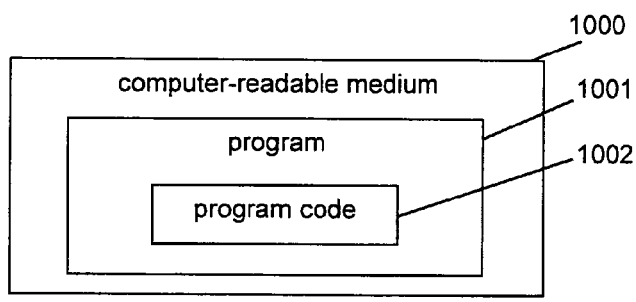
FIG. 10: a schematic illustration of an embodiment of a readable medium according to the present invention.

FIG. 10 is a schematic illustration of an embodiment of a readable medium 1000 according to the present invention.

In this example the readable medium 1000 is a computer-readable medium. A program 1001 according to the fifth aspect of the present invention is stored thereon. The program 1001 comprises program code 1002. When executed by a processor, the instructions of the program code 1002 cause a processor to estimate a state vector of an object, wherein the state vector comprises a state variable related to a position or an orientation of the object, based on at least one of a probability density function of the state vector truncated under consideration of a constraint for the state variable, wherein the constraint is derived from a map, and properties of the truncated probability density function.

The computer-readable medium 1000 may for instance be embodied as an electric, magnetic, electro-magnetic, optic or other storage medium, and may either be a removable storage medium or a storage medium that is fixedly installed in an apparatus or device.

It is to be understood that with respect to all of the above embodiments that relate to a processor the processor may for instance be implemented in hardware alone, may have certain aspects in software alone, or may be a combination of hardware and software. The processor may either be a separate module or it may be a subcomponent of a module such as, for example, a processor or an application specific integrated circuit (ASIC) that has other functional components or structures, too.

It is readily clear for a person skilled in the art that the logical blocks in the schematic block diagrams as well as the flowchart and algorithm steps presented in the above description may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

What is claimed is:

1. An apparatus comprising:
    at least one processor; and
    at least one memory including computer program code;
    the at least one memory and the computer program code configured to, with the at least one processor, cause the apparatus to:
    estimate a state vector of an object, wherein the state vector comprises a state variable related to a position or an orientation of the object, based on at least one of
        a probability density function of the state vector truncated under consideration of a constraint for the state variable derived from a map, and
        properties of the truncated probability density function, wherein in the estimation at least two state vector estimates of the object are calculated for one point in time and the first state vector estimate is characterized by a first probability density function, while the second state vector estimate is characterized by a second probability density function, and wherein a first weight is assigned to the first probability density function and a second weight is assigned to the second probability density function.

2. The apparatus according to claim 1, wherein the apparatus is further caused to perform at least one of deriving the constraint, receiving the constraint, truncating a probability density function to obtain a probability density function truncated under consideration of the constraint and deriving properties of a truncated probability density function of the state vector from properties of the probability density function that can be truncated to obtain the truncated probability density function.

3. The apparatus according to claim 1, further comprising an antenna.

4. The apparatus according to claim 1, wherein the apparatus is a navigation device.

5. The apparatus according to claim 1, wherein the constraint matches at least two disconnected spaces and a probability density function is assigned to each of the disconnected spaces.

6. The apparatus according to claim 1, wherein a weight corresponds to the probability mass of an unsealed truncated probability density function the probability density function truncated under consideration of the constraint is derived from or is identical to.

7. The apparatus according to claim 1, wherein in the estimation of the state vector a weight is updated in an estimation iteration that follows an estimation iteration in which the weight has been initially assigned to a probability density function.

8. The apparatus according to claim 1, wherein the constraint is one of a linear constraint and a linear constraint derived from a nonlinear constraint.

9. The apparatus according to claim 1, wherein the first state vector estimate is described by means of a first probability density function of a preset class of probability density functions and wherein the second state vector estimate is described by means of a second probability density function of the preset class of probability density functions.

10. The apparatus according to claim 1, wherein the first probability density function of the preset class of probability density functions is derived from a truncated probability density function or properties thereof and wherein the second probability density function of the preset class of probability density functions is derived from a truncated probability density function or properties thereof.

11. The apparatus according to claim 1, wherein the estimation of the state vector is performed one of recursively and recursively involving Kalman filtering.

12. The apparatus according to claim 11, wherein an estimate of the state vector that has been obtained in the estimation of the state vector under consideration of a constraint serves as a basis for a subsequent state vector estimation.

13. A method comprising:
    estimation of a state vector of an object, wherein the state vector comprises a state variable related to a position or an orientation of the object, based on at least one of
        a probability density function of the state vector truncated under consideration of a constraint for the state variable derived from a map, and
        properties of the truncated probability density function, wherein in the estimation at least two state vector estimates of the object are calculated for one point in time and the first state vector estimate is characterized by a first probability density function, while the second state vector estimate is characterized by a second probability density function, and wherein a first weight is assigned to the first probability density function and a second weight is assigned to the second probability density function.

14. The method of claim 13, further comprising at least one of deriving the constraint, receiving the constraint, truncating a probability density function to obtain a probability density function truncated under consideration of the constraint, and deriving properties of a truncated probability density function of the state vector from properties of the probability density function that can be truncated to obtain the truncated probability density function.

15. The method according to claim 13, wherein the estimation of the state vector is performed one of recursively and recursively involving Kalman filtering.

16. The method according to any claim 13, wherein the constraint matches at least two disconnected spaces and a probability density function is assigned to each of the disconnected spaces.

17. The method according to claim 13, wherein a weight corresponds to the probability mass of an unscaled truncated probability density function the probability density function truncated under consideration of the constraint is derived from or is identical to.

18. The method according to claim 13, wherein different state models are assigned to the estimation of the first state vector estimate and to the estimation of the second state vector estimate.

19. The method according to claim 13, wherein the constraint is one of a linear constraint and a linear constraint derived from a nonlinear constraint.

20. A non-transitory computer readable medium having computer program code stored thereon, which when executed by a computer processor causes an apparatus to perform:

estimation of a state vector of an object, wherein the state vector comprises a state variable related to a position or an orientation of the object, based on at least one of a probability density function of the state vector truncated under consideration of a constraint for the state variable derived from a map, and properties of the truncated probability density function, wherein in the estimation at least two state vector estimates of the object are calculated for one point in time and the first state vector estimate is characterized by a first probability density function, while the second state vector estimate is characterized by a second probability density function, and wherein a first weight is assigned to the first probability density function and a second weight is assigned to the second probability density function.

* * * * *